(12) United States Patent
Wondraczek et al.

(10) Patent No.: US 12,338,161 B2
(45) Date of Patent: Jun. 24, 2025

(54) METHOD FOR PRODUCING GLASS FIBERS THAT LATERALLY EMIT LIGHT, AND GLASS FIBERS PRODUCED ACCORDING TO SAID METHOD

(71) Applicant: Friedrich-Schiller-Universitaet Jena, Jena (DE)

(72) Inventors: Lothar Wondraczek, Jena (DE); Jan Schröder, Weimar (DE)

(73) Assignee: FRIEDRICH-SCHILLER-UNIVERSITAET JENA, Jena (DE)

( * ) Notice: Subject to any disclaimer, the term of this patent is extended or adjusted under 35 U.S.C. 154(b) by 853 days.

(21) Appl. No.: 17/596,424

(22) PCT Filed: Jun. 9, 2020

(86) PCT No.: PCT/DE2020/000133
§ 371 (c)(1),
(2) Date: Aug. 23, 2022

(87) PCT Pub. No.: WO2020/249152
PCT Pub. Date: Dec. 17, 2020

(65) Prior Publication Data
US 2022/0388891 A1     Dec. 8, 2022

(30) Foreign Application Priority Data

Jun. 11, 2019 (DE) .......................... 102019004113.5

(51) Int. Cl.
*C03B 37/012*    (2006.01)
(52) U.S. Cl.
CPC .. *C03B 37/01211* (2013.01); *C03B 37/01262* (2013.01); *C03B 2205/14* (2013.01)
(58) Field of Classification Search
None
See application file for complete search history.

(56) References Cited

U.S. PATENT DOCUMENTS

| | | | |
|---|---|---|---|
| 5,822,488 A * | 10/1998 | Terasawa | G02B 6/03611 |
| | | | 385/127 |
| 6,091,878 A | 7/2000 | Abramowicz | |

(Continued)

FOREIGN PATENT DOCUMENTS

| | | |
|---|---|---|
| DE | 102008009137 A1 | 8/2009 |
| DE | 102008009138 A1 | 8/2009 |

(Continued)

OTHER PUBLICATIONS

Wondraczek, et al.: Towards Ultrastrong Glasses. Advanced Materials, (2011), 23(39), 4578-4586.

(Continued)

*Primary Examiner* — Cynthia Szewczyk
(74) *Attorney, Agent, or Firm* — Abel Schillinger, LLP

(57) ABSTRACT

The invention relates to a method for producing glass fibers that laterally emit light and to glass fibers produced according to said method. The problem of providing a method that relies on standard available glass components, thus making possible an economical production method that allows a glass fiber to be produced which emits laterally and, in an optically active manner, spectrally shifts, scatters and/or filters light coupled into the fiber when said light exits through the fiber cladding, is solved in that, first, glass tubes (7) and glass rods (5) of identical chemical composition and identical optical refractive index are selected, then first the glass rod (5) is coated completely or over parts of its outer periphery with a vitrifiable material mixture containing optically active substances, in the liquid phase, and the glass rod (5) coated in such a way with this coating (6) after said coating has been dried or consolidated is brought into the glass tube (7) and both are jointly drawn, under the application of heat, to form a glass fiber in a known way.

10 Claims, 2 Drawing Sheets

(56) References Cited

U.S. PATENT DOCUMENTS

Figure 3:
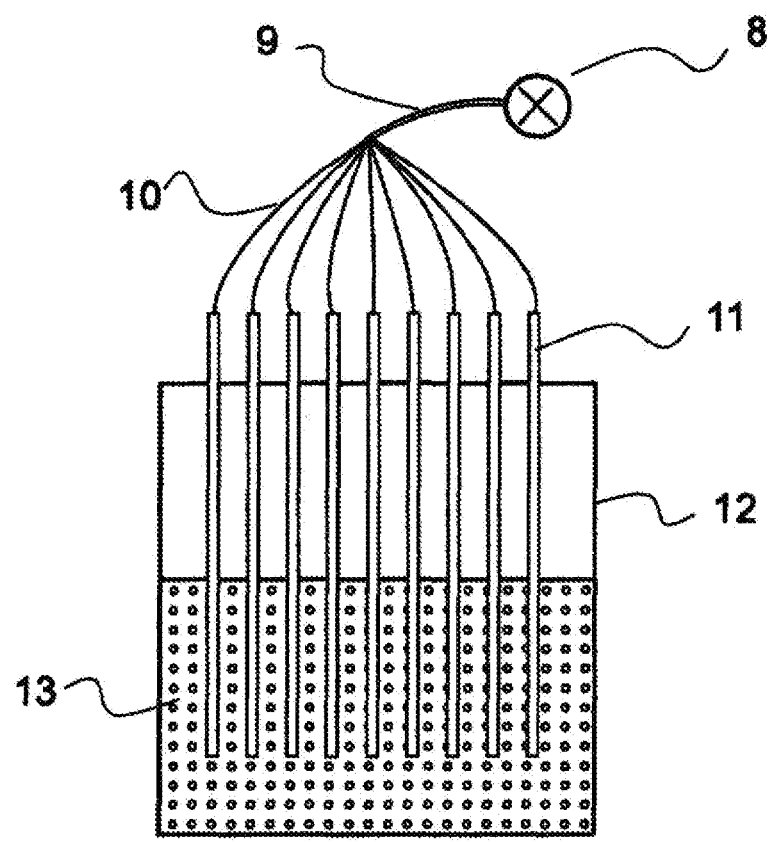

| | | |
|---|---|---|
| 6,259,855 B1 | 7/2001 | Lundin |
| 6,535,667 B1 | 3/2003 | Gozum |
| 8,545,076 B2 | 10/2013 | Bickham |
| 8,582,943 B2 | 11/2013 | Alkemper |
| 8,620,125 B2 | 12/2013 | Button |

FOREIGN PATENT DOCUMENTS

| | | |
|---|---|---|
| DE | 102016003853 A1 | 9/2017 |
| EP | 1319636 A1 | 6/2003 |
| WO | 2009100834 A1 | 8/2009 |

OTHER PUBLICATIONS

Wondraczek, et al.: Shifting the Sun: Solar Spectral Conversion and Extrinsic Sensitization in Natural and Artificial Photosynthesis. Adv Sci. 2015; 2(12):1500218.

* cited by examiner

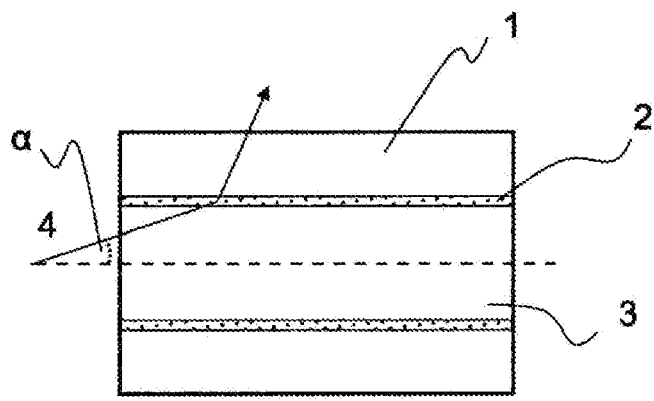
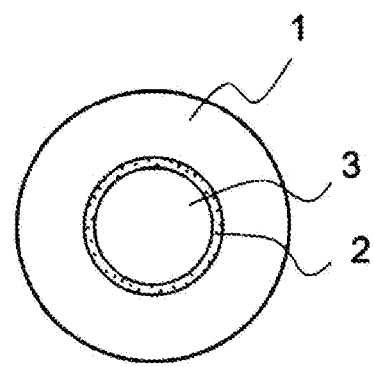
Fig. 1a    Fig. 1b
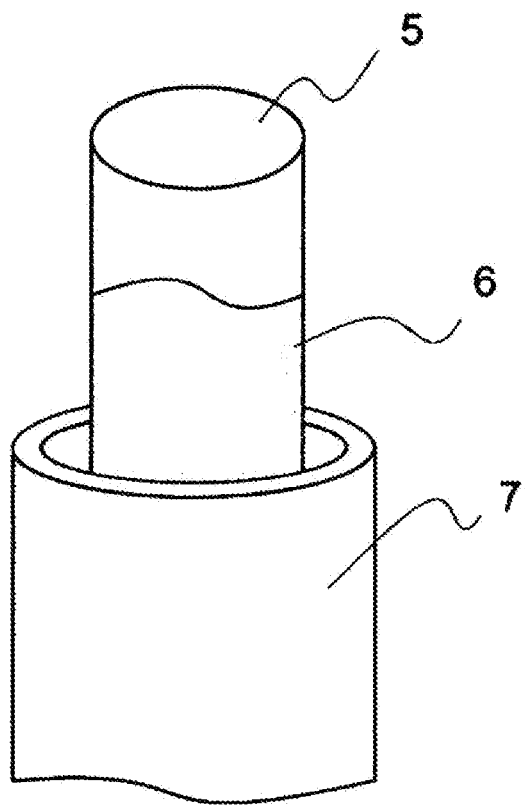
Fig. 2

METHOD FOR PRODUCING GLASS FIBERS THAT LATERALLY EMIT LIGHT, AND GLASS FIBERS PRODUCED ACCORDING TO SAID METHOD

The invention relates to a method for producing glass fibers that emit light laterally and glass fibers produced therefrom. In the context of the present invention, lateral light emission is understood to mean the scattering of electromagnetic radiation of light from the lateral surface of a glass fiber, or the emission of light by fluorescence or filtering with respect to the light coupled into a glass fiber. The light guided in the glass fiber is thus emitted to the media surrounding the glass fiber through a glass fiber length that can be predetermined. Such light-emitting glass fibers can be used in a variety of ways, either individually or in the form of fiber bundles, in particular for the treatment of fluids or for the irradiation of organic tissue, etc.

Optical glass fibers for light transmission typically have a hierarchical structure of fiber core and fiber sheath, which differ mainly in their refractive index n. If light enters the fiber core from the side, light that hits the fiber core-fiber sheath interface at a shallow angle α is guided by total reflection in the core, provided that the refractive index of the glass in the core $n_{core}$ is higher than that of the glass in the fiber sheath $n_{sheath}$. The critical angle for total reflection $α_c$ can be determined using the equation $α_c = \arcsin(n_{sheath}/n_{core})$. The aim of such a hierarchical structure is to transmit as much light intensity as possible with as little loss as possible from one source through the fiber to the other end of the fiber. Loss processes due to scattering and absorption within the optical fiber should therefore be avoided as far as possible in such applications.

Such conventional optical glass fibers are made from cylindrical glass rods with a large diameter (so-called "preforms") by heating these preforms well above the softening point of the glass and twisting them into fibers. In order to achieve the desired refractive index profile, glass rods and glass tubes of different chemical composition and different refractive index are put together to form preforms using known methods (rod in tube).

Due to the differences in the composition of the glasses used for the preform, the fibers have thermal residual stresses after the drawing process which result from the different expansion coefficients of the glasses.

For applications other than pure light transmission, as also provided in the present invention, glass fibers can be modified in such a way that the light guided in the fiber is scattered and the light leaves the fiber via the lateral surface. According to the known state of the art, this can be achieved via light-scattering elements in the glass fiber itself or on the glass fiber surface, or via variations in the fiber core-fiber sheath geometry (e.g. DE 102016003853 A1). Usually, particles with a high melting point or air bubbles are used as scattering particles. The light scattered via these scattering centers essentially has the same spectral properties as the light guided in the fiber. The intensity distribution of the light frequencies from the ultraviolet to the infrared spectral range is understood here as the spectral property. Likewise, the spectral properties are not significantly changed when light-scattering fibers with variations in the fiber core-fiber sheath geometry are used.

For some applications, such as the irradiation of organic material, however, fibers are of interest that change the spectral properties of the guided light through the scattering process, so that the scattered light differs significantly in spectral properties from the light guided in the fiber. In this case, the term "active" scattering is used. In the context of the present invention, this should also be understood to mean spectral shifts or filtering of the light emerging from the sheath in respect of the light coupled into the fiber.

U.S. Pat. No. 6,259,855 B1 reports the use of a light-emitting medium on a glass fiber. Lateral light emission is achieved there by providing the fiber after manufacture with a light-emitting medium in which scattering centers are embedded. This requires post-treatment of the mechanically sensitive glass fiber in order to achieve the light-emitting properties.

Similarly, U.S. Pat. No. 6,091,878 A describes light-emitting polymer fibers with a core-sheath structure in which the lateral light emission is realized via light-scattering elements in the sheath. U.S. Pat. No. 6,535,667 B1 reports polymer fibers with variations in the core-sheath structure which are produced after fiber extraction by pressing a stamp onto a lateral surface. Post-treatment of the fiber is necessary here in order to achieve the light-emitting properties. Furthermore, at lower temperatures, this method is limited to plastics, as the high brittleness of glass does not permit such plastic deformation. DE 10 2016 003 853 A1 reports glass fibers with diameter fluctuations of predeterminable amplitude heights and period lengths in glass fibers with a core-sheath structure. The production of such fibers is not possible with known technology for the production of glass fibers and requires deviations from the fiber drawing process usually used. Such fibers with diameter fluctuations still do not allow any significant spectral change in the scattered light.

U.S. Pat. No. 8,545,076 B2 reports on the use of structures in the nanometer range for light extraction, which are arranged in a glass fiber in the glass fiber core or at the interface between the fiber core and the fiber sheath. Due to the use of different glass materials in the core and sheath as well as the nanostructured area, such a fiber has a radial refractive index profile. However, thermal residual stresses in the glass, due to different expansion coefficients of the glasses used for the core and sheath, can have a negative effect on the mechanical strength and the radiation properties of such fibers [cf. Wondraczek L, Mauro J, Eckert J, Kühn U, Horbach J, Deubener J, & Rouxel T (2011). Advanced Materials, 23(39), 4578-4586].

DE 102008009137 A reports glass fibers that contain an area between the core and the sheath in which light-scattering particles are introduced. With this type of production, it is also necessary to use an additional inlay tube into which the scattering particles have been introduced beforehand. Glass fibers of this type thus also have a sheath with a changed refractive index and the aforementioned disadvantages associated therewith.

U.S. Pat. No. 8,620,125 B2 reports glass fibers that contain spirally arranged pores that wind around the longitudinal axis of the fiber. The pores are either in the fiber core or in an area between the core and the sheath. Such glass fibers also have a radially inhomogeneous refractive index profile.

EP 1319636 A2 describes a production method with the aid of which light-scattering elements are introduced into a fiber during fiber production before it is provided with a protective polymer layer. For example, one embodiment provides for the introduction of scattering centers with the aid of focused laser radiation.

Laterally light-emitting glass fibers can be used as lighting elements by connecting them to a light source and emitting the light to the environment at the side of the fiber. The light from the light source can be coupled into the fiber from both ends of the fiber either on one side or on both sides. Depending on the nature of the light source and the radiation behavior, interior spaces or design elements can be illuminated where the element to be illuminated is spatially separated from the light source.

Wondraczek L, Tyystjärvi E, Méndez-Ramos J, Wüller FA, Zhang Q. Shifting the Sun: Solar. Adv Sci. 2015; 2(12):1500218 reports on the use of such light-emitting fibers to illuminate algae bioreactors with visible red light. The advantage of using such fibers is that the fiber as a light-emitting element can be brought close to the algae within such an algae bioreactor and such lighting leads to significantly more efficient photosynthesis than conventional lighting.

Light-emitting fibers which change the spectral properties of the light, for example via active scattering centers, such that, for example, mainly red light is scattered from the lateral surface of the fiber, would be interesting for such an application. Such active scattering centers can be, for example, luminescent or selectively scattering centers. Selective scattering is understood here to mean that only a specific range of the electromagnetic spectrum of the light coupled into the fiber is scattered.

The known possibilities cited above for producing a laterally light-emitting glass fiber have a number of disadvantages which make them appear unsuitable for many applications.

The application of an additional layer which contains the light-scattering elements to the outer surface of the glass fiber (as reported, for example, in U.S. Pat. No. 6,259,855 B1) requires an additional manufacturing step after the fiber production, which increases the production labor and costs. In addition, such a layer can have a negative effect on the emission behavior of the glass fiber, since additional absorption effects make light emission difficult or even completely prevent it, for example in the infrared or ultraviolet spectral range.

If glasses with different refractive indices are used to produce light-emitting fibers, the glass fibers have thermal residual stress due to different thermal expansions of the glasses, which can have negative effects on the mechanical properties and the light-emitting properties.

The introduction of scattering centers during the fiber drawing requires an economically unfavorable high level of technological adaptation of the classical manufacturing process.

If light-scattering elements are used that are introduced into the preform before fiber production (as, for example, in DE 102008009137 A), only light-scattering elements made of a material that does not decompose or melt at the fiber extraction temperature can be used. However, such materials do not permit adjustment of the spectral properties of the scattered light. Furthermore, these light-scattering elements must be melted into the preform beforehand. Therefore, standard glass rods and glass tubes cannot be used for such a method.

In addition, such scattering centers reduce the mechanical resilience of the glass fibers, since mechanical stresses on such elements result in excessive mechanical stress.

Bubbles, which are used as light-scattering elements according to the known prior art, also reduce the mechanical strength of the glass fibers. Such bubbles also do not permit any spectral adjustment of the scattered light.

The invention is therefore based on the object of specifying a method which uses glass components that are available as standard, with which a cost-effective manufacturing method is specified which makes it possible to produce a laterally radiating glass fiber, which optically actively induces a spectral shift in, scatters and/or filters the light coupled into the fiber when the light exits through the fiber sheath, and avoids the disadvantages of the prior art.

The object is achieved by the characterizing features of claims 1 and 8. Advantageous embodiments are the subject of the subordinate claims.

The essence of the present invention is that glass tubes and glass rods of the same chemical composition and the same optical refractive index are first selected, then the glass rod is first coated completely or over parts of its outer periphery in the liquid phase with a vitrifiable material mixture containing optically active substances and the glass rod coated in this way with this coating, after it has been dried or compacted, is introduced into the glass tube and both are deformed together under heat to form a glass fiber in a known manner.

The invention allows the production of a light-emitting glass fiber in which the light-scattering elements are embedded in a homogeneous glass fiber with a uniform refractive index profile. The light-scattering elements are located in a ring over the fiber cross-section. The substances used according to the invention that scatter light or that influence the spectral properties also permit spectral adjustment of the light, so that the spectral properties of the scattered and/or fluorescent or similar light differ from the spectral properties of the light guided in the fiber. The glass fiber produced in this way differs from known glass fibers in that both the fiber sheath and the fiber core are made of the same material with the same refractive index and a layer with light-scattering particles and/or optically active substances is provided between the fiber sheath and the fiber core, which optically actively brings about a spectral shift in, scatters and/or filters the light coupled into the fiber, depending on the materials used for this layer.

The present invention is based on the discovery that light-scattering elements can be incorporated into a glass fiber by providing conventional glass rods with a vitreous layer containing the light-scattering elements. These glass rods can then be encased in a glass tube of the same composition and processed into a preform for subsequent fiber extraction. Glass fibers made from these preforms have a homogeneous refractive index profile with the light-scattering elements at the rod/tube interface. The basic chemical composition of the coating is adapted to the composition of the glass tube and glass rod. The light-scattering elements are added to the coating medium used prior to coating. The coating material is in liquid form and the glass rod is coated from the liquid phase.

The following exemplary embodiments and figures are intended to explain the invention in more detail. In the figures:

FIGS. 1a and 1b show an example of a longitudinal section and cross section of a glass fiber according to the invention, FIG. 2 shows an exploded drawing of a coated glass rod surrounded by an enclosing glass tube and FIG. 3 shows an exemplary possible application for light-scattering fibers in an algae bioreactor.

The starting point for the realization of the present invention is firstly a glass tube 7 and a glass rod 5 which can be accommodated by the inside of the glass tube 7. Both the glass rod 5 and the glass tube 7 should be made of chemically identical materials with the same refractive index, wherein glasses with a lower melting point than that of quartz glasses customarily used for light transmission are preferably used within the scope of the invention.

Borosilicate glasses are thus preferably used in the present invention. It is also in accordance with the invention that the glass rod 5 is first provided with a coating 6 from the liquid phase, which contains the substances or particles that later have an optically active effect in the drawn glass fiber, which undergo a chemical transformation that can be set as desired by heat application during a separate treatment of the coating and/or during the fiber drawing process.

For the production of the coating 6 of the glass rod 5 according to the invention, the following are some specific exemplary embodiments:

A first embodiment provides for the coating of a conventional borosilicate glass rod with alkoxides. For this purpose, a mixture of alkoxide precursors tetraethyl orthosilicate (TEOS) and triethyl borate (TEB) with a molar ratio of 0.7:0.3 is first prepared and diluted with 5 mole fractions of ethanol. Then distilled water is diluted with small amounts of nitric acid (1 mole of water to 0.001 mole of nitric acid). About 0.01 mole of silver nitrate per mole of water is added to this and dissolved with stirring. The resulting solution is then added to the alkoxide-ethanol mixture in a 4-fold molar quantity and stirred for at least 10 minutes. To increase the viscosity, about 10-20% by volume of glycerin is added to the solution. Subsequently, the borosilicate glass rod 2 is coated by dipping it into the prepared solution and pulling it out at a constant drawing speed (100 mm/min). The coating is then dried at 100° C. for half an hour and then compacted and hardened at 400° C. for another half hour. The coated rod 5 is now enclosed in a borosilicate glass tube 7 of the same composition and fused together at one end by fusing it in a glassmaker's flame. The resulting preform is fixed in a heating unit known per se, heated in it and drawn into glass fibers by a person skilled in the art in a known manner. The fiber drawing temperature is above the softening point of the glass, so that tube and rod fuse into a homogeneous glass fiber during fiber drawing. The silver contained in the coating 6 is reduced to metallic silver due to the increased temperature and consequently precipitates to metallic particles. The use of other metallic nanoparticles is within the scope of the invention. The size of the particles results from the duration of the heat treatment and is therefore directly dependent on the manufacturing parameters (preform diameter $d_p$, fiber diameter $d_f$, feed speed of the preform $v_p$, fiber drawing speed $v_f$, fiber drawing temperature T). For the production parameters used within the scope of the invention, the resulting metallic particles are then present with a diameter of a few multiples of 10 nm. When used in the example of silver, these metallic particles present in the drawn fiber then selectively scatter blue light.

A second embodiment provides for the coating of a conventional borosilicate glass rod 5 with a slip. To produce the slip, borosilicate glass of the same composition as the tube and rod is first ground dry in a planetary mill using zirconium oxide grinding balls and grinding bowls. The resulting glass powder is mixed with europium trioxide ($Eu_2O_3$) or samarium trioxide ($Sm_2O_3$) powder so that the total proportion of $Eu_2O_3$ or $Sm_2O_3$ is 2 mol %. The powder mixture is then wet-ground in water for 60 minutes using smaller (d<2 mm) grinding balls, the mass fraction of water being over 65%. The resulting slip is then acidified with a small amount of low-concentration nitric acid to reduce the sedimentation tendency. The slip is then applied to the glass rod with a conventional brush or by means of a dip coating method. The layer is now dried at 100° C. for 30 minutes and its surface is then strongly heated by a person skilled in the art in a glassmaker's flame (e.g., acetylene-oxygen mixture) so that the coating 6 becomes vitrified and appears optically transparent. The coated rod is now, as described above, covered with a borosilicate glass tube of the same composition and fused together at one end by fusion in a glassmaker's flame. The resulting preform is fixed in a heating unit, heated in it and drawn into glass fibers by a person skilled in the art in a known manner.

In a further exemplary embodiment, a conventional borosilicate glass is coated with a combination of an alkoxide mixture and a slip. For this purpose, as described in the first exemplary embodiment, a mixture of alkoxide precursors, ethanol, water and nitric acid is prepared. The solution obtained is mixed to 50 percent by volume with the slip as described in the second exemplary embodiment. The mixture of alkoxide solution and slip is applied to the glass rod either by means of a dip coating method or with a conventional brush and then dried at 100° C. for 30 minutes. The layer is now compacted at 400° C. for 30 minutes and its surface is then strongly heated by a person skilled in the art in a glassmaker's flame in order to vitrify it. The coated rod is now covered enclosed by a borosilicate glass tube of the same composition and fused together at one end by fusion in a glassmaker's flame. The resulting preform is fixed in a heating unit, heated in it and drawn into glass fibers by a person skilled in the art in a known manner.

It is of course within the scope of the invention to use other methods in addition to the above-described coatings of the glass rod in the dipping process, such as spray coating, etc. It is also expressly within the scope of the invention to carry out the coating process repeatedly in order to adjust the layer thickness of the coating 6 to a predeterminable desired value. If the coating 6 together with the optically active elements it contains is then present in a non-crystalline form, the glass rod 5 surrounded by the glass tube 7 can be further processed directly to form the preform. If the coating 6 is (partially) crystalline, it must first be vitrified, as explained above in an example, before the glass rod 5 treated in this way is placed in the glass tube 7 in order to then draw this preform into a fiber 11.

The individual manufacturing steps described above are to be illustrated on the basis of the attached figures:

FIG. 1a shows the longitudinal section of a part of a laterally light-emitting glass fiber according to the invention in its extended end state. This glass fiber consists of a fiber sheath 1 with the refractive index $n_1$, a region 2 containing the light-scattering elements and a fiber core 3 with refractive index $n_2$. According to the invention, the refractive indices of the fiber core and fiber sheath are chosen to be identical ($n_1=n_2$), fiber core 3 and fiber sheath 1 are spatially separated from one another only by region 2, which contains the light-scattering elements. If light 4 is radiated laterally into the fiber at an angle a (cf. FIG. 1a) and this strikes a light-scattering element in area 2 in the fiber, the direction of propagation can change after the scattering process and the light exits the fiber via the lateral surface. Similarly, FIG. 1b shows the cross section of a fiber according to the invention. The area containing the light-scattering elements spatially separates core and sheath glass. The radial position of the scattering area results from the preform geometry (diameter of the core rod, inner and outer diameter of the sheathing tube) and is located at the former interface between the core rod and the sheathing tube. The thickness of the scattering region depends on the coating thickness on the core rod of the preform and the fiber diameter after fiber production. All of the parameters mentioned above can be varied as desired by the person skilled in the art and can be adapted to the later intended use of the glass fibers according to the invention.

FIG. 2 shows an exploded drawing of a preform according to the invention made of coated glass rod 5 and glass tube 7. The glass rod 5 is previously provided with the coating 6, which results in the scattering area 2 (according to FIG. 1*a*) after the drawing process. The scattering particles are either created during the drawing process or are introduced into the coating matrix beforehand. The glass tube 7 has the same composition as the glass rod 5 and encloses the glass rod 5 and the coating 6 after the fiber drawing process.

FIG. 3 shows a preferred possible application at the time of registration. Shown here are several side-emitting optical fibers used to illuminate algae bioreactors, as described in the previous steps. Light is guided from a light source 8 via classical light-conducting fibers 9 in the fiber bundle and individually via a branching element 10 to the side-emitting glass fibers 11 according to the invention. In an algae bioreactor 12 there is a liquid medium with organic algae material, which breaks down carbon dioxide via photosynthesis and generates oxygen and biomass. The light-emitting glass fibers are fully or partially immersed in the liquid medium 13 containing algae material. The algae are illuminated via the lateral light output of the glass fibers according to the invention, which permits significantly increased energy efficiency compared to purely external lighting without the use of laterally light-emitting fibers according to the invention.

Further possible uses of the optical fibers produced according to the present invention are within the scope of the invention. In particular, their use in the field of medicine, e.g., for light therapy.

All features identifiable in the description, the exemplary embodiments, and the drawings can be essential to the invention both individually and in any combination with one another.

LIST OF REFERENCE SIGNS

1—fiber sheath
2—region containing the light-scattering elements
3—fiber core
4—incident light
5—glass rod
6—coating
7—glass tube
8—light source
9—classical light-conducting fibers
10—branching element
11—laterally light-emitting glass fibers
12—algae bioreactor
13—liquid medium

The invention claimed is:

1. A method for the production of a glass fiber, comprising:
    selecting a glass tube (7) and a glass rod (5) of the same chemical composition and the same optical refractive index;
    coating the glass rod (5) completely or partially over its outer periphery with a liquid vitrifiable material mixture containing optically active substances to form a coated glass rod (5);
    drying and compacting the coated glass rod;
    placing the coated glass rod after drying and compacting in the glass tube (7); and
    applying heat to jointly draw the coated glass rod and the glass tube to form the glass fiber, wherein the glass fiber laterally emits light.

2. The method according to claim 1, characterized in that glass types with a lower melting point than quartz glass are selected for the glass tube (7) and the glass rod (5).

3. The method according to claim 1, characterized in that a mixture is used for the coating (6) with a basic chemical composition adapted to the composition of the glass tube (7) and glass rod (5).

4. The method according to claim 1, characterized in that borosilicate glasses are selected for the glass tube (7) and the glass rod (5).

5. The method according to claim 1, characterized in that the glass rod (5) used is first provided with a coating (6) which essentially consists of a mixture of alkoxide precursors tetraethyl orthosilicate (TEOS) and triethyl borate (TEB), diluted with ethanol and mixed with small amounts of nitric acid and silver nitrate, which is then dried and compacted and hardened in a tempering process.

6. The method according to claim 1, characterized in that the glass rod (5) used is first coated with a slip essentially consisting of finely ground glass of the same composition as the glass tube and glass rod, mixed with europium trioxide ($Eu_2O_3$) or samarium trioxide ($Sm_2O_3$) powder, which is dried and vitrified before the glass rod (5) coated therewith is introduced into the glass tube (7).

7. The method according to claim 1, characterized in that the glass rod (5) is first coated with a mixture of an alkoxide mixture and a slip, which is dried, compacted and vitrified by thermal treatment before the coated glass rod (5) is introduced into the glass tube (7).

8. The glass fiber of claim 1, characterized in that both a fiber sheath (1) and a fiber core (3) are made of the same material with the same refractive index and that a layer (2) of light-scattering particles and/or optically active substances is provided between the fiber coat and the fiber core, which optically actively cause a spectral shift in, scatter and/or filter light (4) coupled into the fiber, depending on which materials are used for this layer (2).

9. The glass fiber according to claim 8, characterized in that the layer (2) contains metallic nanoparticles, in particular silver.

10. The glass fiber according to claim 8 characterized in that the layer (2) is essentially made of glass of the same basic composition as that of the glass tube (7) and the glass rod (5), wherein a layer of slip is used in its production, to which $Eu_2O_3$ or $Sm_2O_3$ is added.

* * * * *